(12) United States Patent
Choi et al.

(10) Patent No.: US 7,450,809 B2
(45) Date of Patent: Nov. 11, 2008

(54) OPTICAL UNIT, A METHOD OF MANUFACTURING THE SAME, A BACKLIGHT ASSEMBLY HAVING THE SAME AND A DISPLAY DEVICE HAVING THE SAME

(75) Inventors: Jin-Sung Choi, Cheonan-si (KR); Jheen-Hyeok Park, Seongnam-si (KR); Ju-Hwa Ha, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/492,714

(22) Filed: Jul. 25, 2006

(65) Prior Publication Data

US 2007/0019131 A1    Jan. 25, 2007

(30) Foreign Application Priority Data

Jul. 25, 2005    (KR)    .................. 10-2005-0067104

(51) Int. Cl.
*G02B 6/10* (2006.01)

(52) U.S. Cl. ...................................... 385/129; 385/901
(58) Field of Classification Search ................ 385/146, 385/901
See application file for complete search history.

(56) References Cited

U.S. PATENT DOCUMENTS

| | | | | |
|---|---|---|---|---|
| 6,002,464 | A * | 12/1999 | Fujisawa et al. | 349/112 |
| 7,010,212 | B2 * | 3/2006 | Emmons et al. | 385/146 |
| 2007/0147760 | A1 * | 6/2007 | Iimura | 385/129 |

* cited by examiner

*Primary Examiner*—Sarah Song
(74) *Attorney, Agent, or Firm*—F. Chau & Associates, LLC (57) ABSTRACT

An optical unit, a method of manufacturing the same, a backlight assembly having the same and a display device have the same are provided. The optical unit includes a transparent body, a diffusion part and a luminance increasing part. The diffusion part is formed on or in the body to diffuse light. The luminance increasing part includes an embossing pattern formed on the body to increase a luminance of the diffused light when viewed on a plane.

25 Claims, 11 Drawing Sheets

OPTICAL UNIT, A METHOD OF MANUFACTURING THE SAME, A BACKLIGHT ASSEMBLY HAVING THE SAME AND A DISPLAY DEVICE HAVING THE SAME

CROSS-REFERENCE TO RELATED APPLICATION

The present application claims priority to Korean Patent Application No. 2005-67104, filed on Jul. 25, 2005, the disclosure of which is incorporated by reference herein in its entirety.

BACKGROUND OF THE INVENTION

1. Technical Field

The present invention relates to an optical unit having improved optical characteristics, and more particularly, to a method of manufacturing the optical unit, a backlight assembly having the optical unit and a display device having the optical unit.

2. Discussion of the Related Art

A liquid crystal display (LCD) is one of the most widely used flat panel displays. For example, an LCD is commonly found in a variety of electronic devices such as flat screen televisions, laptop computers, cell phones and digital cameras.

An LCD device displays an image using electrical and optical characteristics of liquid crystals. For example, in the LCD device, an arrangement of the liquid crystals varies in response to an electric field applied thereto, thus a light transmittance of a liquid crystal layer including the liquid crystals is changed. Since the liquid crystals are non-emissive type display elements, the LCD device uses a backlight assembly.

The backlight assembly is classified as a direct illumination type or an edge illumination type. The direct illumination type backlight assembly includes a plurality of light sources on a lower portion thereof. The edge illumination type backlight assembly includes a light guiding plate and a light source located on a side of the light guiding plate.

The backlight assembly includes a plurality of optical parts to improve optical characteristics such as luminance uniformity, luminance, etc., of light generated from the light source. The optical parts may include a number of optical sheets such as a diffusion plate, a diffusion sheet, a prism sheet, a brightness enhancement sheet, etc. When the number of the optical sheets is increased, a thickness of the backlight assembly is increased.

A conventional brightness enhancement sheet such as a dual brightness enhancement film (DBEF) is generally used in the backlight assembly. However, the DBEF is expensive, thereby increasing a manufacturing cost of the backlight assembly. Therefore, a need exists for an apparatus that is capable of reducing the thickness of the backlight assembly and increasing the display brightness of the LCD device in a cost effective manner.

SUMMARY OF THE INVENTION

An optical unit in accordance with one embodiment of the present invention includes a transparent body, a diffusion part and a luminance increasing part. The diffusion part is formed on or in the body to diffuse light. The luminance increasing part includes an embossing pattern formed on the body to increase a luminance of the diffused light when viewed on a plane.

The diffusion part may include a plurality of gas bubbles or a plurality of beads. The diffusion part may be adjacent to the luminance increasing part. The diffusion part may include a plurality of diffusion elements such as the gas bubbles or beads, and a size of each of the gas bubbles or beads may be about 1 µm to about 100 µm.

The luminance increasing part may include an embossing part including a substantially polygonal pyramid shape having a rounded apex. Alternatively, the luminance increasing part may include an embossing part including a substantially polygonal pyramid shape and a substantially conical shape without a rounded apex. The embossing part may be protruded from the body and may include a plurality of gas bubbles.

The luminance increasing part may include an ultraviolet curable resin. The optical unit may further include an ultraviolet light blocking layer formed on the body to prevent a coloration of the body, wherein the ultraviolet light blocking layer is not adjacent to the diffusion part.

A method of manufacturing an optical unit in accordance with one embodiment of the present invention is provided as follows. A diffusion part is formed on or in a transparent plate including a polymer resin. A luminance increasing part including an embossing pattern is formed on the transparent plate.

The diffusion part may be formed by supplying the transparent plate with air at a pressure higher than an atmospheric pressure so that the gas is absorbed in the transparent plate, and expanding the absorbed gas to form gas bubbles in the transparent plate. The gas may be absorbed in the transparent plate by ejecting the gas at the pressure higher than the atmospheric pressure so that the gas may be injected into spaces formed by chains of high polymer molecules of the transparent plate. The gas bubbles are formed by heating the transparent plate having the absorbed gas to expand the absorbed gas, and discharging the expanded gas from the transparent plate. Examples of the gas may include air, carbon dioxide, nitrogen, oxygen, etc. These can be used alone or in combination.

The diffusion part may also be formed by arranging diffusion beads in the transparent plate or on a surface of the transparent plate.

The luminance increasing part may be formed by coating an ultraviolet light curable resin layer on the transparent plate having the diffusion part, pressing the ultraviolet light curable resin layer using a cast having a pattern corresponding to the embossing pattern to form the embossing pattern on the ultraviolet light curable resin layer, and irradiating an ultraviolet light onto the ultraviolet light curable resin layer having the embossing pattern to solidify the ultraviolet light curable resin layer having the embossing pattern.

The ultraviolet light curable resin comprises at least one selected from the group consisting of an acryl based resin, an acetophenone based resin, a benzophenone based resin and a thioxanthone based resin. A plurality of gas bubbles may be formed in the ultraviolet light curable resin layer having the embossing pattern.

An ultraviolet light blocking layer may be formed on the transparent plate corresponding to the luminance increasing part.

A backlight assembly in accordance with one embodiment of the present invention includes a light source and an optical unit. The optical unit includes a transparent body, a diffusion part formed on or in the body to diffuse light generated from the light source, and a luminance increasing part including an embossing pattern formed on the body to increase a luminance of the diffused light when viewed on a plane.

The luminance increasing part may guide the diffused light toward a front of the optical unit.

The light source may be arranged on a bottom surface of the body opposite the luminance increasing part, and the backlight assembly may further include a diffusion sheet formed on the luminance increasing part to diffuse the light.

The backlight assembly may further include a light guiding unit. The light guiding unit may include a light incident portion and a light exiting portion. The light generated from the light source may be incident through the light incident portion. The light exiting portion may face a bottom surface of the optical unit.

A display device in accordance with one embodiment of the present invention includes a display panel and a backlight assembly. The display panel displays an image based on uniform light. The backlight assembly supplies the display panel with the uniform light. The backlight assembly includes a light source and an optical unit. The optical unit includes a diffusion part having a porous medium to diffuse light generated from the light source, and a luminance increasing part including an embossing pattern formed on the diffusion part to increase a luminance of the diffused light when viewed on a plane to generate the uniform light.

BRIEF DESCRIPTION OF THE DRAWINGS

The above and other features of the present invention will become more apparent by describing in detail exemplary embodiments thereof with reference to the accompanying drawings, in which.

DESCRIPTION OF EXEMPLARY EMBODIMENTS

Exemplary embodiments of the invention are described more fully hereinafter with reference to the accompanying drawings. This invention may, however, be embodied in many different forms and should not be construed as limited to the embodiments set forth herein.

Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the embodiments of the present invention will be described in detail with reference to the accompanying drawings.

Figure 1:
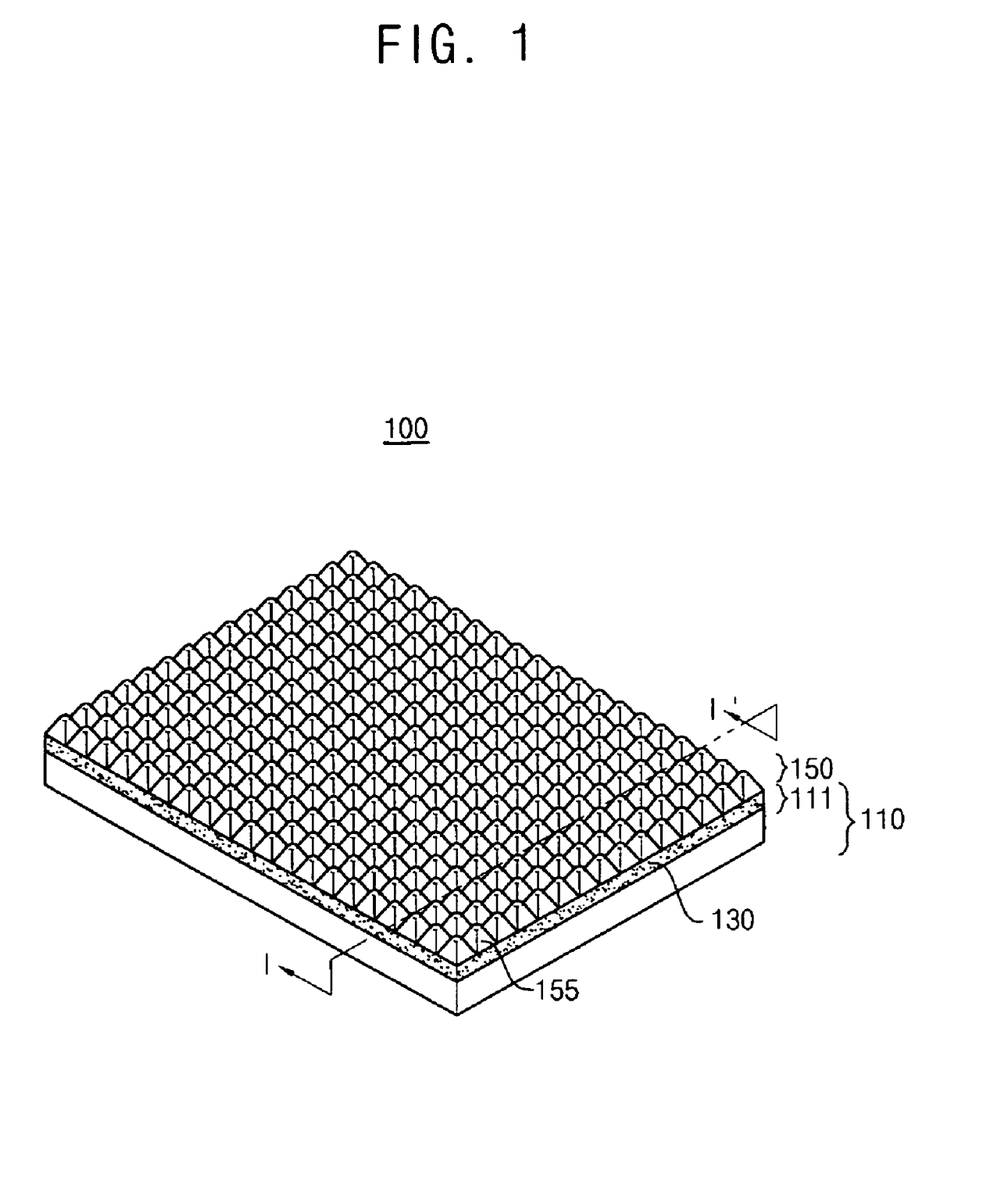
FIG. 1 is a perspective view showing an optical unit in accordance with one exemplary embodiment of the present invention.

FIG. 1 is a perspective view showing an optical unit 100 in accordance with one embodiment of the present invention.

Referring to FIG. 1, the optical unit 100 includes a body 110, a diffusion part 130 and a luminance increasing part 150.

The body 110 may include a transparent plate. The body 110 includes a skin layer 111 that planarizes a surface of the body 110. The body 110 includes a high polymer that has various characteristics such as high light transmittance, heat resistance, chemical resistance, impact resistance, etc. Examples of the high polymer that can be used for the body 110 include polymethylmethacrylate (PMMA), polyamide, polyimide, polypropylene, polyurethane, etc. These can be used alone or in combination. Polymer chains of the high polymer of the body 110 have a net shape having spaces so that air molecules may pass through the spaces.

Figure 2:
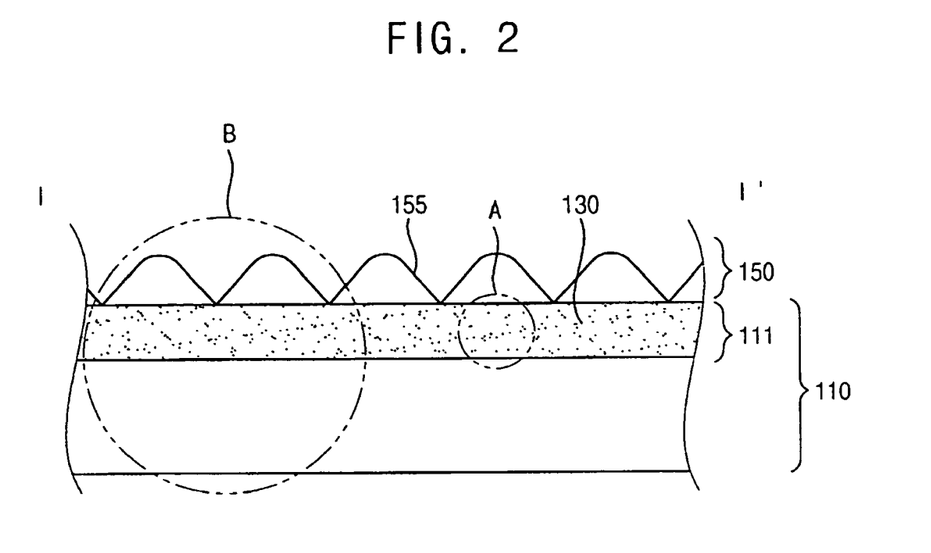
FIG. 2 is a cross-sectional view taken along a line I-I' shown in FIG. 1.

FIG. 2 is a cross-sectional view taken along a line I-I' shown in FIG. 1.

Referring to FIGS. 1 and 2, the diffusion part 130 is on the body 110, and is adjacent to the luminance increasing part 150. Alternatively, the diffusion part 130 may be integrally formed in the body 110. For example, the diffusion part 130 may be an upper portion of the body 110.

The diffusion part 130 diffuses light that has passed through the body 110 to increase a luminance uniformity of the light. The luminance uniformity of the light that has passed through the diffusion part 130 is increased due to a difference between a refractive index of the diffusion part 130 and a refractive index of the body 110. For example, when the difference between the refractive index of the diffusion part 130 and the refractive index of the body 110 is large, the luminance uniformity of the light that has passed through the diffusion part 130 is high.

Figure 3:
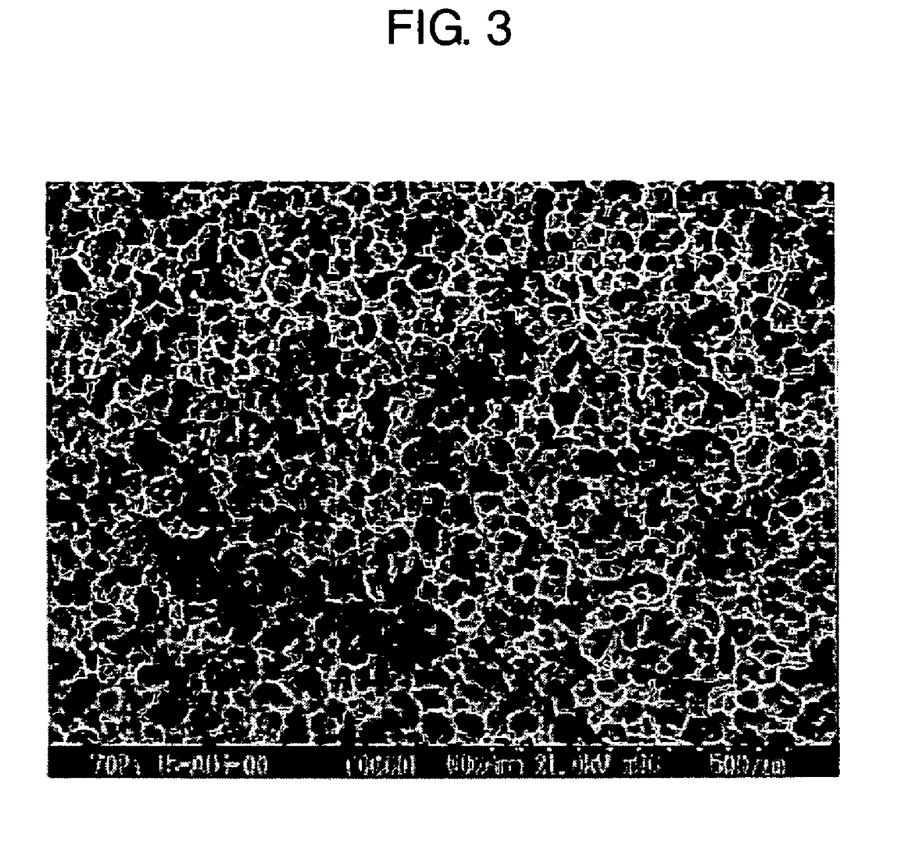
FIG. 3 is an image showing a first region A where a diffusion part of FIG. 2 is formed.

FIG. 3 is an image showing a first region A where the diffusion part 130 of FIG. 2 is formed.

Referring to FIGS. 1 to 3, the diffusion part 130 is in a skin layer 111, and includes a plurality of gas bubbles in the skin layer 111 to increase the difference between the refractive index of the diffusion part 130 and the refractive index of the body 110. The skin layer 111 may be a porous medium. For example, a gas such as air is injected between the spaces of the polymer chains, and the injected gas is expanded to form the gas bubbles in the skin layer 111. In other words, the gas bubbles are in the skin layer 111. The gas bubbles may be uniformly distributed in the skin layer 111. Alternatively, the gas bubbles may be uniformly distributed in the body 110.

Sizes of the gas bubbles may be changed in response to an amount of gas in the skin layer 111, a heating temperature for expanding the gas, a pressure of the gas, a time for expanding the gas, etc. When the sizes of the gas bubbles that have a constant volume percent with respect to the body 110 are decreased, a density of the gas bubbles adjacent to a surface of the body 110 is increased. In other words, when the sizes of the gas bubbles are decreased, a thickness of the skin layer 111 is decreased so that the gas bubbles are concentrated. When the density of the gas bubbles is increased, light is more uniformly diffused.

When the gas bubbles are formed in the skin layer 111, the skin layer 111 has a porous structure. When the body 110 has the skin layer 111 having the porous structure, a mechanical strength of the body 110 is increased. In particular, when the sizes of the gas bubbles are decreased, the mechanical strength of the body 110 is increased. For example, the sizes of the gas bubbles may be about 1 µm to about 100 µm. In other words, the sizes of the gas bubbles may be about several micrometers to about tens of micrometers.

Figure 4:
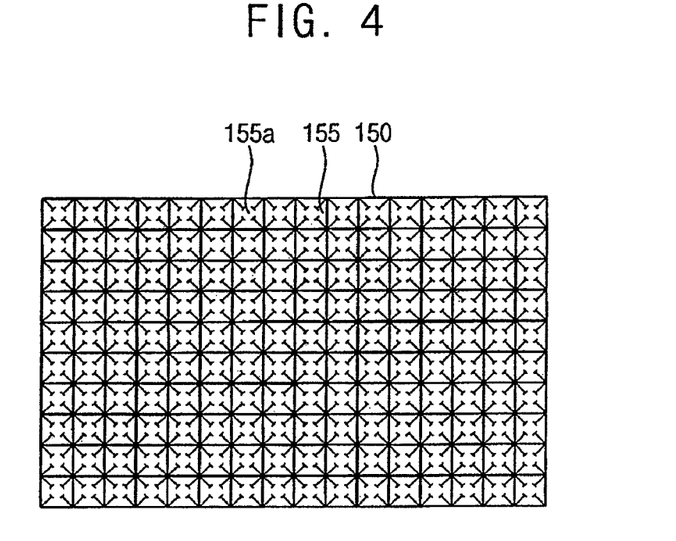
FIG. 4 is a plan view showing the optical unit shown in FIG. 1.

FIG. 4 is a plan view showing the optical unit 100 shown in FIG. 1.

Referring to FIGS. 1, 2 and 4, the luminance increasing part 150, which is on the body 110, has a plurality of embossing parts 155. The embossing parts 155 may be arranged substantially in a matrix.

Each of the embossing parts 155 may have a pyramid shape having a rounded apex 155a. For example, each of the embossing parts 155 includes four edges that are aligned toward the apex 155a. When the apex 155a of each of the embossing parts 155 is rounded, the luminance of light when viewed on a plane such as a display panel is increased so that optical characteristics of the luminance increasing part 150 are improved. Alternatively, the four edges of each of the embossing parts 155 may be rounded.

The luminance increasing part 150 may include an ultraviolet light curable resin. An ultraviolet light curable resin layer may be formed on the body 110, and solidified to form the luminance increasing part 150 attached to the body 110.

Examples of the ultraviolet light curable resin that can be used for the luminance increasing part 150 include an acryl based resin, an acetophenone based resin, a benzophenone based resin, a thioxanthone based resin, etc. These can be used alone or in combination.

Figure 5:
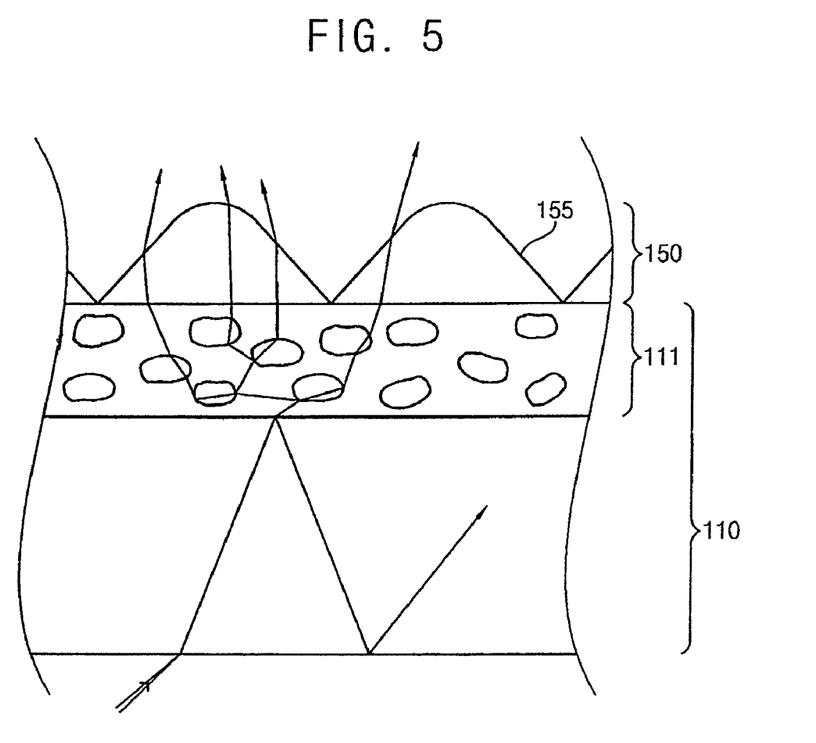
FIG. 5 is a cross-sectional view showing a second region B shown in FIG. 2.

FIG. 5 is a cross-sectional view showing a second region B shown in FIG. 2.

Referring to FIG. 5, the diffusion part 130 of the optical unit 100 increases a luminance uniformity of light, and the luminance increasing part 150 increases the luminance of the light when viewed on a plane.

In particular, the light that has passed through the body 110 is incident into the skin layer 111. The light incident into the skin layer 111 is repetitively reflected and refracted on interfaces between the gas bubbles and the skin layer 111 to be diffused. The light that has passed through the skin layer 111 has a higher luminance uniformity than the light that has passed through the body 110.

The light that has passed through the skin layer 111 is refracted and reflected by an interface between the embossing parts 155 and external air so that an area through which the light exits, and an incident angle of the light that is incident onto the embossing parts 155 is decreased, thereby increasing the luminance of the light.

The embossing parts 155 increase the luminance of the light when viewed on the plane. Thus, the embossing parts 155 can increase the luminance of a backlight assembly. For example, since each of the embossing parts 155 has the pyramid shape to increase the luminance of the light when viewed on the plane, and the light that has passed through the embossing parts 155 is uniform, the luminance of the backlight assembly can be increased.

The optical unit 100 may be used as an optical characteristic improving part of a display device such as a liquid crystal display (LCD) device, an electrophoresis display device, etc. For example, in the LCD device, the optical unit 100 may be used alone or in conjunction with a plurality of optical characteristic improving parts such as a diffusion plate, a diffusion sheet, a brightness enhancement film (BEF), a dual brightness enhancement film (DBEF), etc.

Table 1 represents optical characteristics for several optical characteristic improving parts.

TABLE 1

| Optical characteristic improving parts | Case I<br>PMMA diffusion plate + Diffusion sheet + BEF + BDEF | Case II<br>Optical Unit of FIGS. 1, 2 and 4 | Case III<br>Optical Unit of FIGS. 1, 2 and 4 + Diffusion Sheet |
|---|---|---|---|
| 25 Points Average | 7441.8 | 7341.8 | 7597.7 |
| 13 Points Average | 7447.0 | 7377.0 | 7599.0 |
| 5 Points Average | 7584.0 | 7484.0 | 7699.0 |
| Lux (Center) | 7656.0 | 7521.0 | 7799.0 |
| Wx (Center) | 0.2889 | 0.2888 | 0.2888 |
| Wy (Center) | 0.2857 | 0.2867 | 0.2867 |
| Relative Value of 25 Points | 100% | 99.0% | 102.0% |
| Relative Value of 13 Points | 100% | 99.0% | 100.0% |
| Relative Value of 5 Points | 100% | 99.0% | 102.0% |
| 25 Points Luminance Uniformity (%) | 78.2 | 76.2 | 78 |
| 13 Points Luminance Uniformity (%) | 80.0 | 80.0 | 80.0 |

The optical characteristic improving parts of Table 1 are used for an LCD television receiver set having a size of about thirty two inches. A current of about 6.0 mA is applied from an inverter to a lamp of the LCD television receiver set for about thirty minutes. A luminance of the LCD television receiver set is detected in front of the LCD television receiver set.

In Case I, the optical characteristic improving parts include the PMMA diffusion plate, the diffusion sheet, the BEF and the DBEF stacked in sequence. The average luminance of the 25 points is about 7441.8 [nit]. The average luminance of the 13 points is about 7447.0 [nit]. The average luminance of the 5 points is about 7584.0 [nit]. A luminance of the entire backlight assembly is about 7656 [nit]. An x-coordinate of white light generated from the backlight assembly is about 0.2889 in color coordinates. A y-coordinate of the white light generated from the backlight assembly is about 0.2857 in color coordinates.

In Case II, the optical characteristic improving parts include the optical unit of FIGS. 1, 2 and 4. The average luminance of the 25 points is about 7341.8 [nit]. The average luminance of the 13 points is about 7377.0 [nit]. The average luminance of the 5 points is about 7484.0 [nit]. A luminance of the entire backlight assembly is about 7521.0 [nit]. An x-coordinate of white light generated from the backlight assembly is about 0.2888 in color coordinates. A y-coordinate of the white light generated from the backlight assembly is about 0.2867 in color coordinates.

In Case III, the optical characteristic improving parts include the optical unit of FIGS. 1, 2 and 4 and the diffusion sheet. The average luminance of the points is about 7590.7 [nit]. The average luminance of the 13 points is about 7599.0 [nit]. The average luminance of the 5 points is about 7699.0 [nit]. A luminance of the entire backlight assembly is about 7799.0 [nit]. An x-coordinate of white light generated from the backlight assembly is about 0.2888 in color coordinates. A y-coordinate of the white light generated from the backlight assembly is about 0.2867 in color coordinates.

In Case I, the luminance uniformity of the 25 points is about 78.2%, and the luminance uniformity of the 13 points is about 80.0%. In Case II, the luminance uniformity of the 25 points is about 76.2%, and the luminance uniformity of the 13 points is about 80.0%. In Case III, the luminance uniformity of the 25 points is about 78.0%, and the luminance uniformity of the 13 points is about 80.0%.

The relative luminance of Case II is about 99% with respect to that of Case I. The relative luminance of Case III is about 102% with respect to that of Case I. Therefore, the relative luminance of Case III is greater than that of Case I or Case II.

In addition, the x-coordinates of the white light generated from the backlight assemblies of Cases I, II and III are substantially the same. Furthermore, the y-coordinates of the white light generated from the backlight assemblies of Cases I, II and III are substantially the same.

In addition, the luminance uniformities of the backlight assembly of Cases I, II and III are substantially the same.

Therefore, a backlight assembly having the optical unit 100 may have improved optical characteristics even though the backlight assembly may not have the diffusion plate, the diffusion sheet, the brightness enhancement sheet and the dual brightness enhancement sheet.

Figure 6:
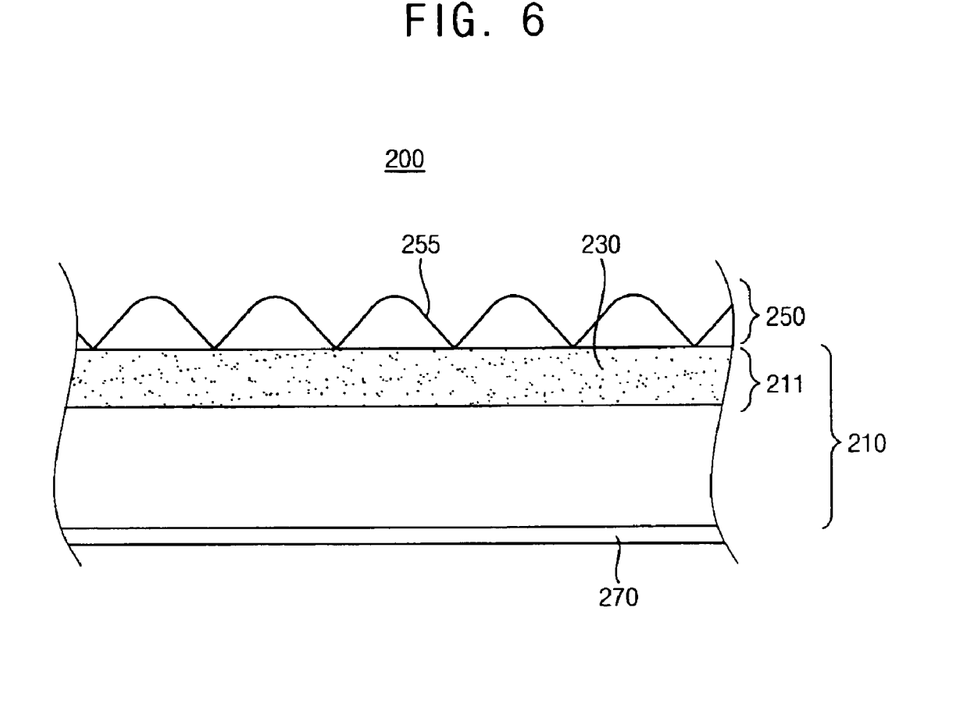
FIG. 6 is a cross-sectional view showing an optical unit in accordance with another exemplary embodiment of the present invention.

FIG. 6 is a cross-sectional view showing an optical unit 200 in accordance with another embodiment of the present invention.

The optical unit of FIG. 6 is same as that shown in FIGS. 1 to 5 except that it includes an ultraviolet light blocking layer 270. Thus, the same reference numerals, which differ only in that they begin with "2", will be used to refer to the same or like parts as those described in FIGS. 1 to 5.

Referring to FIG. 6, a light source (not shown) may be under the optical unit 200. The light source (not shown) generates light including a visible light and an ultraviolet light. When the ultraviolet light is irradiated onto the optical unit 200, the optical unit 200 may become yellow, thereby decreasing a light transmittance of the optical unit 200.

The ultraviolet light blocking layer 270 is under a body 210 corresponding to a luminance increasing part 250. The ultraviolet light blocking layer 270 blocks the ultraviolet light that is generated from the light source (not shown) to prevent the coloration of the optical unit 200.

Figure 7:
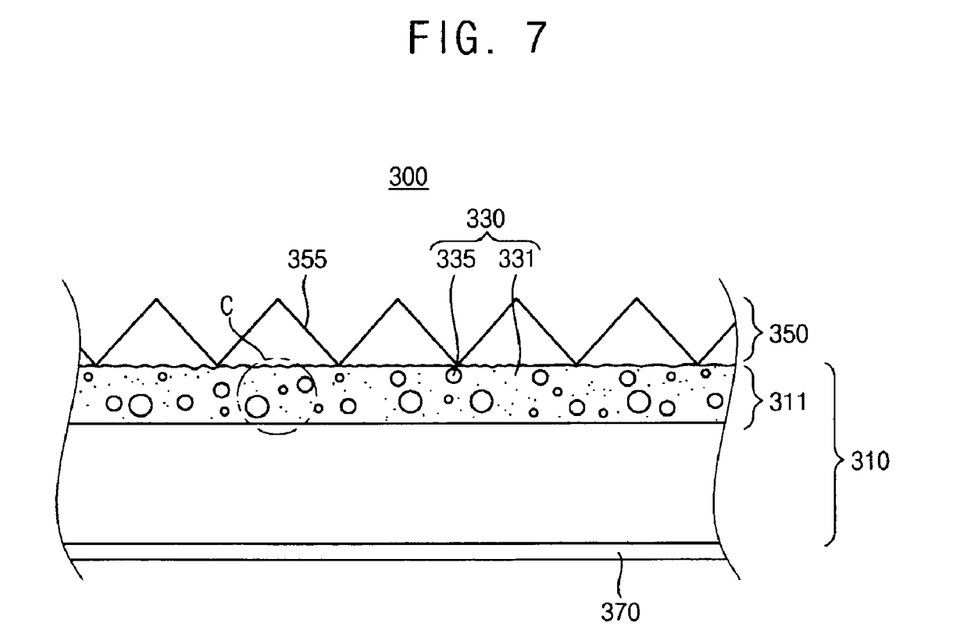
FIG. 7 is a cross-sectional view showing an optical unit in accordance with another exemplary embodiment of the present invention.
Figure 8:
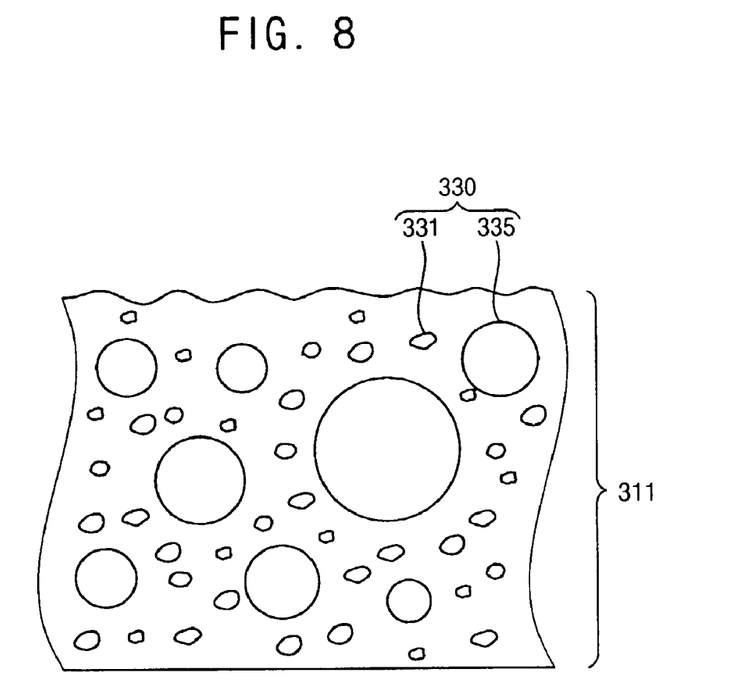
FIG. 8 is an enlarged cross-sectional view showing a third region C where a diffusion part shown in FIG. 7 is formed.

FIG. 7 is a cross-sectional view showing an optical unit 300 in accordance with another embodiment of the present invention. FIG. 8 is an enlarged cross-sectional view showing a third region C where a diffusion part 330 shown in FIG. 7 is formed.

Referring to FIGS. 7 and 8, the optical unit 300 includes a body 310, the diffusion part 330, a luminance increasing part 350 and an ultraviolet light blocking layer 370.

The body 310 may include a plate (not shown) and a binding layer 311. The plate may include a polymer resin. The diffusion part 330 is attached to the plate through the binding layer 311.

The diffusion part 330 is in the binding layer 311, and includes a first diffusion portion 331 and a second diffusion portion 335.

The first diffusion portion 331 includes a plurality of gas bubbles in the binding layer 311. The bubbles may also be in an upper portion of the plate. The second diffusion portion 335 includes a plurality of beads in the binding layer 311. The beads are fixed to the plate through the binding layer 311. The beads may be covered by the binding layer 311. Alternatively, a portion of the beads may be exposed.

The beads may have various characteristics such as high mechanical strength, high chemical resistance, high light transmittance, etc. The beads may include PMMA. The beads may have a different refractive index from the binding layer 311. In FIGS. 7 and 8, the diffusion part 330 includes the gas bubbles and the beads so that a luminance uniformity of a backlight can be greatly increased.

The luminance increasing part 350 is on the binding layer 311, and has a plurality of embossing parts 355. Each of the embossing parts 355 may have a substantially quadrangular pyramid shape. Alternatively, each of the embossing parts 355 may have a substantially triangular pyramid shape or a substantially conical shape. The embossing parts 355 of FIGS. 7 and 8 are essentially the same as those described in FIGS. 1 to 5 except for their shape.

The diffusion part 330 of the optical unit 300 increases a luminance uniformity of light, and the luminance increasing part 350 increases the luminance of the light when viewed on a plane.

In particular, light that has passed through the body 310 is incident into the binding layer 311. The light incident into the binding layer 311 is repetitively reflected and refracted by interfaces between the gas bubbles and the binding layer 311 and interfaces between the beads and the binding layer 311 to be diffused. The light that has passed through the binding layer 311 has a higher luminance uniformity than the light that has passed through the body 310.

The light that has passed through the binding layer 311 is refracted and reflected by an interface between the embossing parts 355 and external air so that an area through which the light exits, and an incident angle of the light that is incident onto the embossing parts 355 is decreased, thereby increasing the luminance of the light.

The ultraviolet light blocking layer 370 is under the body 310 corresponding to the luminance increasing part 350.

Figure 9:
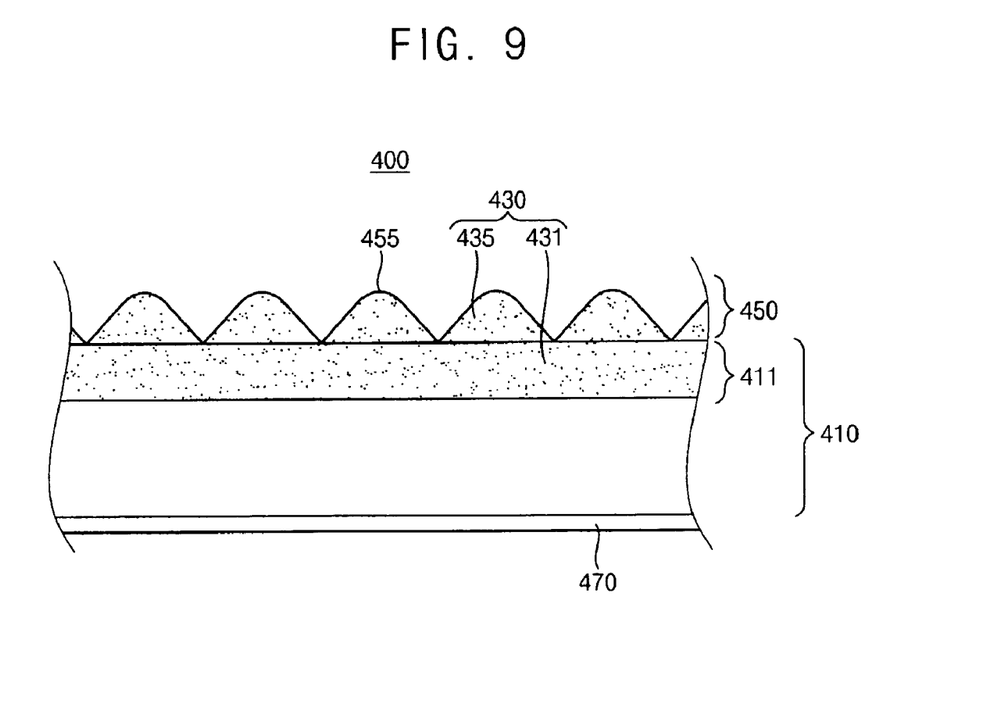
FIG. 9 is a cross-sectional view showing an optical unit in accordance with another exemplary embodiment of the present invention.

FIG. 9 is a cross-sectional view showing an optical unit 400 in accordance with another embodiment of the present invention.

The optical unit of FIG. 9 is same as that shown in FIGS. 1 to 5 except for a diffusion part 430 and an ultraviolet light blocking layer 470. Thus, the same reference numerals, which differ only in that they begin with "4", will be used to refer to the same or like parts as those described in FIGS. 1 to 5.

Referring to FIG. 9, the optical unit 400 includes a body 410, the diffusion part 430 and a luminance increasing part 450.

The diffusion part 430 includes a first diffusion portion 431 and a second diffusion portion 435.

The first diffusion portion 431 includes a plurality of gas bubbles in a skin layer 411. The second diffusion portion 435 is in the luminance increasing part 450 above the skin layer 411.

In particular, the luminance increasing part 450 is on the skin layer 411, and has a plurality of embossing parts 455. Each of the embossing parts 455 may have a substantially quadrangular pyramid shape having a rounded apex. The second diffusion part 435 may include a plurality of gas bubbles in the embossing parts 455.

The optical unit 400 may further include the ultraviolet light blocking layer 470 under the body 410 corresponding to the luminance increasing part 450.

Figure 10:
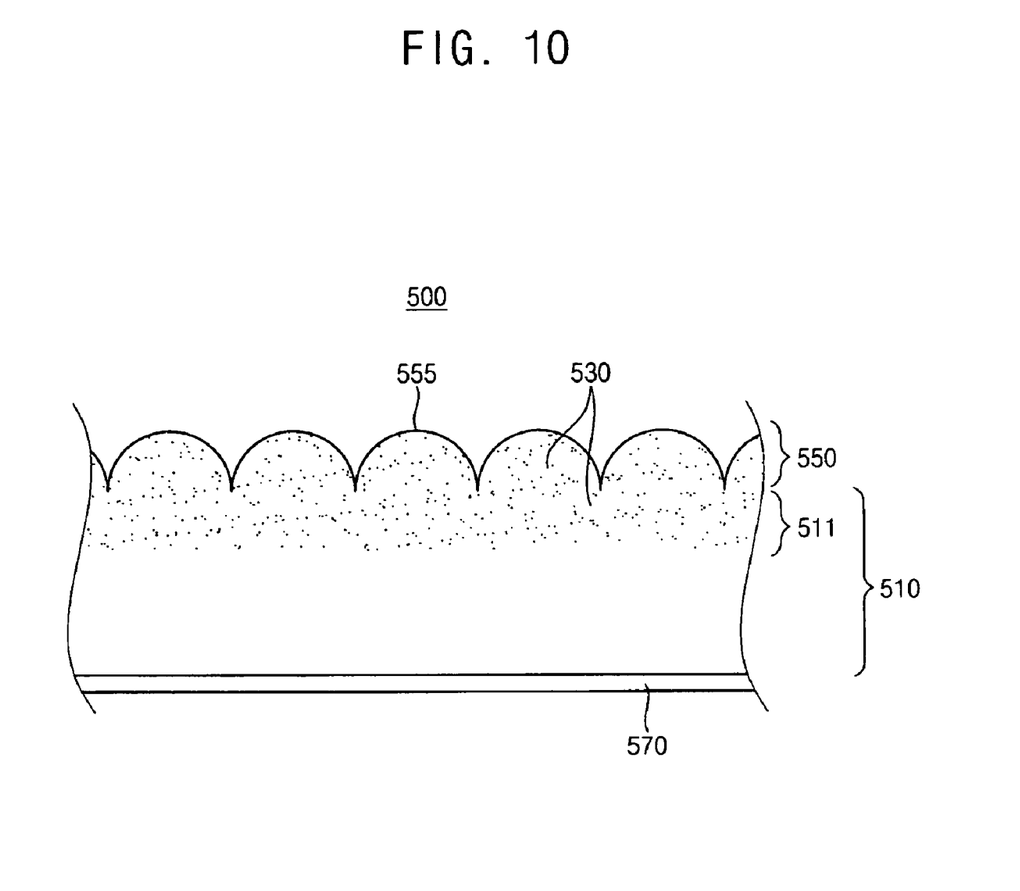
FIG. 10 is a cross-sectional view showing an optical unit in accordance with another exemplary embodiment of the present invention.

FIG. 10 is a cross-sectional view showing an optical unit 500 in accordance with another embodiment of the present invention.

The optical unit of FIG. 10 is same as that shown in FIGS. 1 to 5 except for a luminance increasing part 550, a diffusion part 530 and an ultraviolet light blocking layer 570. Thus, the same reference numerals, which differ only in that they begin with "5", will be used to refer to the same or like parts as those described in FIGS. 1 to 5.

Referring to FIG. 10, the optical unit 500 includes a body 510, the diffusion part 530, the luminance increasing part 550 and the ultraviolet light blocking layer 570.

The luminance increasing part 550 includes a plurality of embossing patterns 555 that are integrally formed with the body 510. An upper portion of the body 510 may be molded by pressing a cast having patterns corresponding to the embossing patterns 555 to form the embossing patterns 555. In FIG. 10, each of the embossing patterns 555 may have a substantially semicircular shape.

The diffusion part 530 includes a plurality of gas bubbles in the embossing part 555 and in a portion of the body 510 that is under the embossing part 555. The diffusion part 530 is adjacent to an upper surface of the body 510.

The ultraviolet light blocking layer 570 is under the body 510 corresponding to the luminance increasing part 550.

Figure 11:
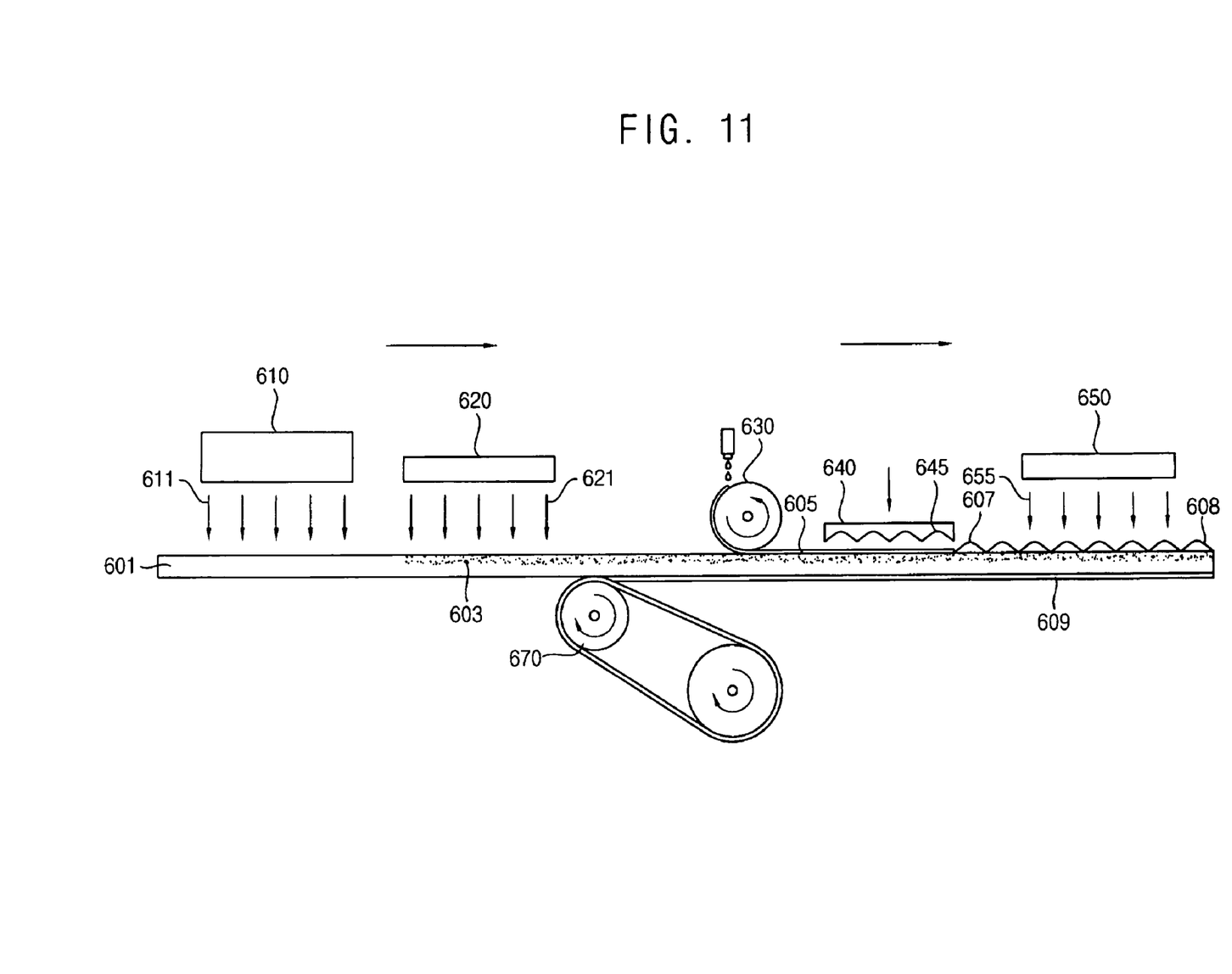
FIG. 11 is a cross-sectional view showing a method of manufacturing an optical unit in accordance with another exemplary embodiment of the present invention.

FIG. 11 is a cross-sectional view showing a method of manufacturing an optical unit in accordance with another embodiment of the present invention.

Referring to FIG. 11, a diffusion part is formed on an upper portion of a transparent plate 601 including a high polymer. In particular, a gas is absorbed in an upper portion of the transparent plate 601 including the high polymer at a predetermined pressure that is greater than an atmospheric pressure. Examples of the gas that can be absorbed in the upper portion of the transparent plate 601 include air, carbon dioxide, oxygen, nitrogen, etc. These can be used alone or in combination. The gas that is absorbed in the upper portion of the transparent plate 601 is expanded to form a plurality of gas bubbles in the upper portion of the transparent plate 601.

Examples of the high polymer that can be used for the transparent plate 601 may include PMMA, polyamide, polyimide, polypropylene, polyurethane, etc. These can be used alone or in combination. The high polymer may be ejected from a molding device used to form the transparent plate 601. The transparent plate 601 includes a skin layer that is not solidified to absorb air.

The transparent plate 601 having the skin layer is prepared in a chamber under a carbon dioxide atmosphere. A gas supplying unit 610 supplies the chamber with a carbon dioxide gas 611, and increases the pressure in the chamber. The gas supplying unit 610 ejects the carbon dioxide gas 611 at a high pressure so that the carbon dioxide gas 611 is injected into the skin layer. For example, the skin layer is showered by the carbon dioxide gas 611. Polymer chains of the high polymer of the skin layer have a net structure having spaces so that carbon dioxide molecules of the carbon dioxide gas 611 may be injected into the spaces.

A hot air supplying unit 620 supplies the transparent plate 601 with hot air 621 to heat the transparent plate 601. When the carbon dioxide molecules of the carbon dioxide gas 611 in the skin layer are heated, the carbon dioxide molecules in the skin layer are expanded to form gas bubbles 603. The expanded carbon dioxide molecules are discharged from the gas bubbles 603, and separated from the skin layer.

A luminance increasing part 608 is formed on the skin layer having the gas bubbles 603. The luminance increasing part includes a plurality of embossing patterns 607.

In particular, an ultraviolet light curable resin layer 605 is coated on the skin layer of the transparent plate 601 using a first roller 630. Examples of ultraviolet light curable resin that can be used for the ultraviolet light curable resin layer 605 include an acryl based resin, an acetophenone based resin, a benzophenone based resin, a thioxanthone based resin, etc. These can be used alone or in combination.

The ultraviolet light curable resin layer 605 is pressed by a mold 640 having an embossed shape 645 to form the embossing patterns 607 on the ultraviolet light curable resin layer 605. An ultraviolet light irradiating unit 650 irradiates an ultraviolet light 655 onto the ultraviolet light curable resin layer 605 having the embossing patterns 607 to solidify the ultraviolet light curable resin layer 605, thereby forming the luminance increasing part 608.

An ultraviolet light blocking layer 609 is formed on a lower surface of the transparent plate 601 corresponding to the luminance increasing part 608 using a second roller 670.

Alternatively, the gas bubbles 603 may be formed after the embossing patterns 607 are formed.

Figure 12:
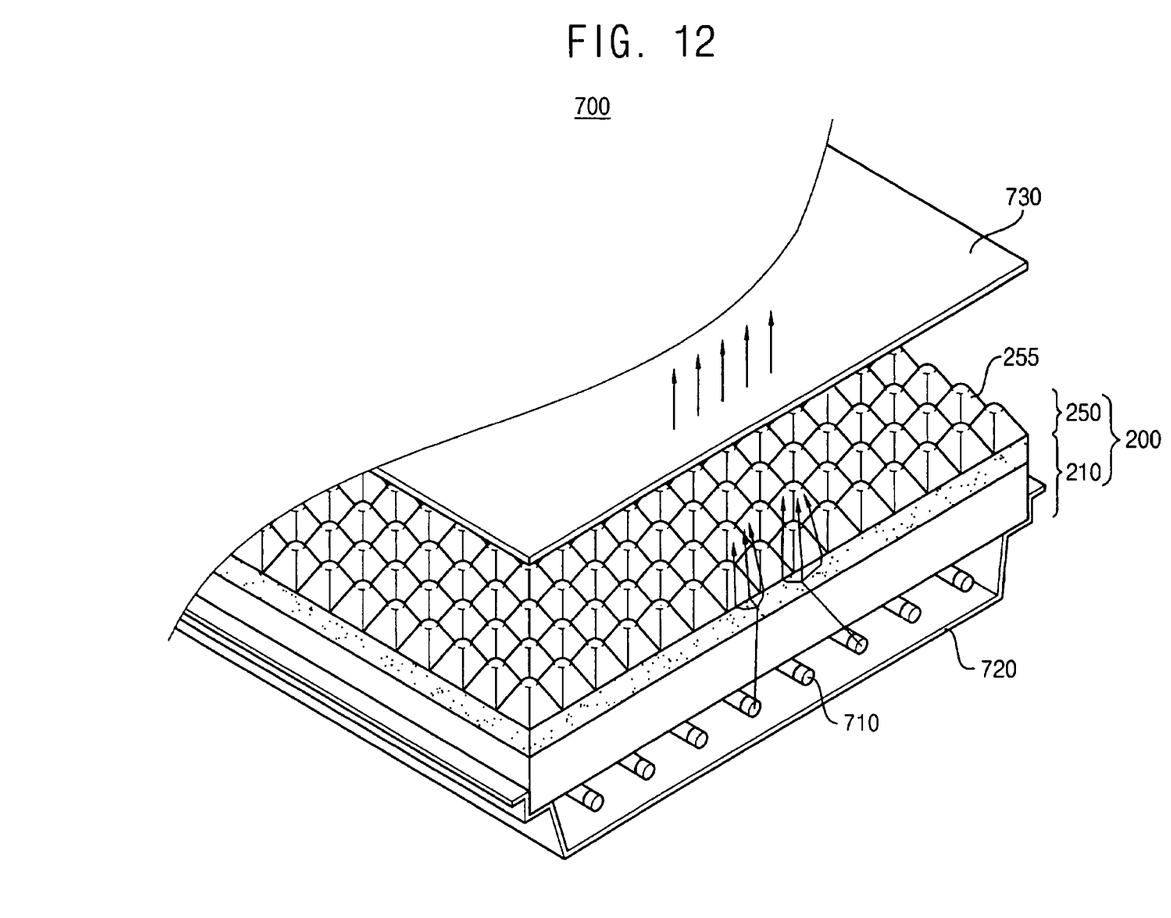
FIG. 12 is a perspective view showing a backlight assembly in accordance with another exemplary embodiment of the present invention.

FIG. 12 is a perspective view showing a backlight assembly 700 in accordance with another embodiment of the present invention.

Referring to FIG. 12, the backlight assembly 700 includes a light source 710, a receiving container 720, an optical unit 200 and a diffusion sheet 730.

The light source 710 may include a lamp. The lamp includes a lamp tube, a fluorescent layer and an electrode part. The lamp tube includes a discharge gas. The fluorescent layer is coated on an inner surface of the lamp tube. The electrode part includes a plurality of electrodes on end portions of the lamp tube. When a voltage is applied to the electrode part, an ultraviolet light is generated from the discharge gas. The ultraviolet light is changed into visible light by the fluorescent layer. A portion of the ultraviolet light may not be changed into the visible light and passed through the fluorescent layer.

The lamp is received in the receiving container 720. A plurality of lamps that are substantially in parallel with each other may be arranged on a bottom plate of the receiving container 720.

The optical unit 200 is on a stepped portion that is formed on a sidewall of the receiving container 720. The optical unit of FIG. 12 is the same as that shown in FIG. 6.

An ultraviolet light blocking layer 270 is on a lower surface of a body 210 of the optical unit 200 to block the portion of the ultraviolet light that is not changed into visible light, thereby preventing a coloration of the body 210. The visible light that has passed through the ultraviolet light blocking layer 270 may be reflected and refracted by gas bubbles of the skin layer 211, thereby diffusing the visible light.

When the diffused light passes through a luminance increasing part 250 having a plurality of embossing patterns 255, the light is refracted toward a front of the optical unit 200. Thus, the luminance increasing part 250 increases a luminance of the backlight assembly 700 when viewed on a plane. The embossing patterns 255 increase an area of a light exiting surface, and decrease an incident angle of the light that is incident into the embossing patterns 255 to increase the luminance of the backlight assembly 700 when viewed on the plane.

The diffusion sheet 730 is on the optical unit 200 to diffuse the light that has passed through the optical unit 200, thereby increasing the luminance uniformity of the backlight assembly 700. Alternatively, the optical sheet 730 may be omitted. In addition, the backlight assembly 700 may also include the optical unit 300 shown in FIG. 7.

Figure 13:
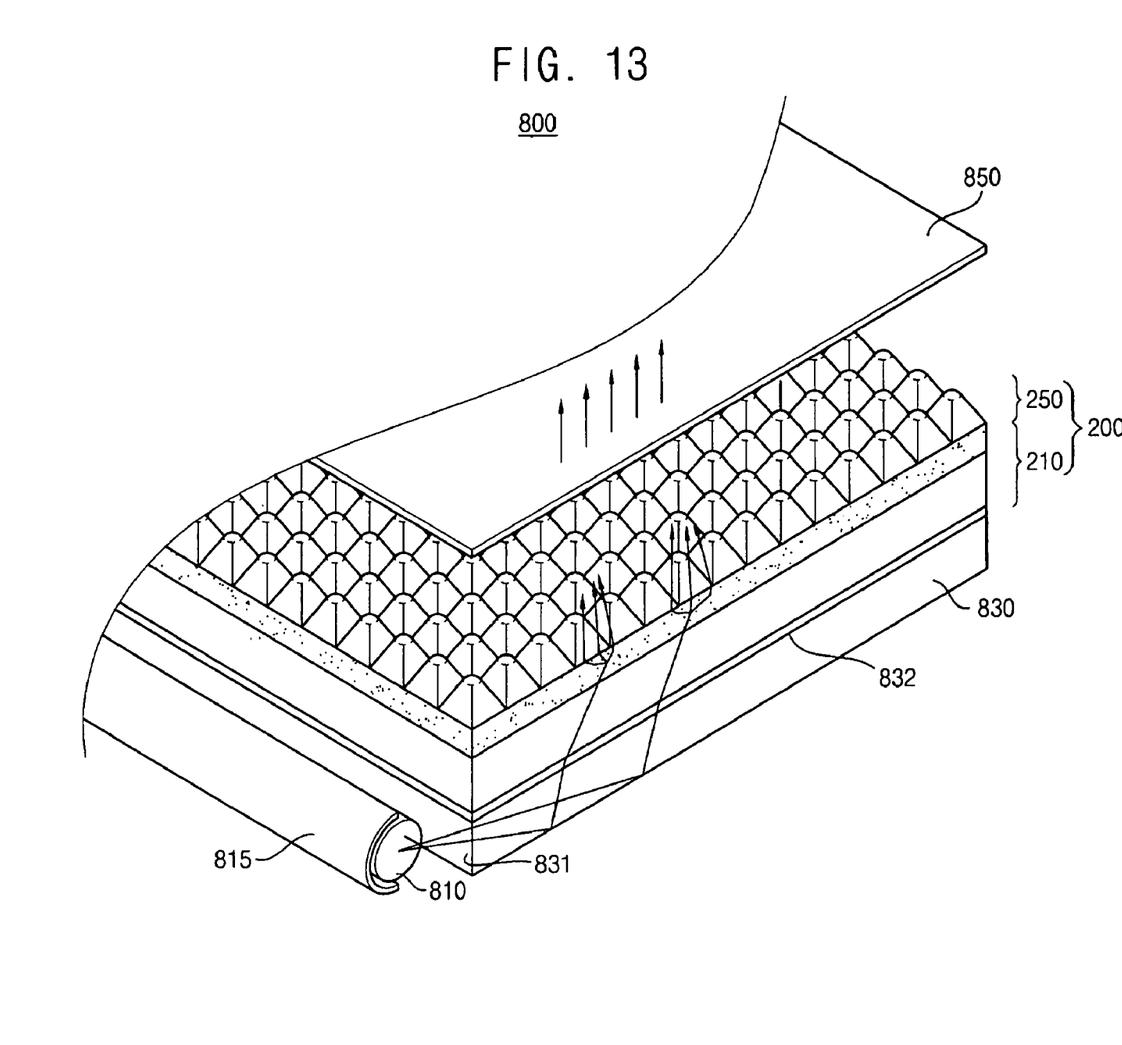
FIG. 13 is a perspective view showing a backlight assembly in accordance with another exemplary embodiment of the present invention.

FIG. 13 is a perspective view showing a backlight assembly 800 in accordance with another embodiment of the present invention.

A light source, an optical unit and a diffusion sheet of FIG. 13 are the same as those shown in FIG. 12.

Referring to FIG. 13, the backlight assembly 800 includes a light source 810, a light guiding unit 830, an optical unit 200 and a diffusion sheet 850. The light guiding unit 830 has a plate shape, and includes a light incident portion 831 and a light exiting portion 832.

The light incident portion 831 may be a side surface of the light guiding unit 830, and the light exiting portion 832 may correspond to a bottom surface of the optical unit 200. In other words, the light exiting portion 832 may face the bottom surface of the optical unit 200. The light guiding unit 830 guides a light generated from the light source 810 toward the optical unit 200 through the light exiting portion 832.

Figure 14:
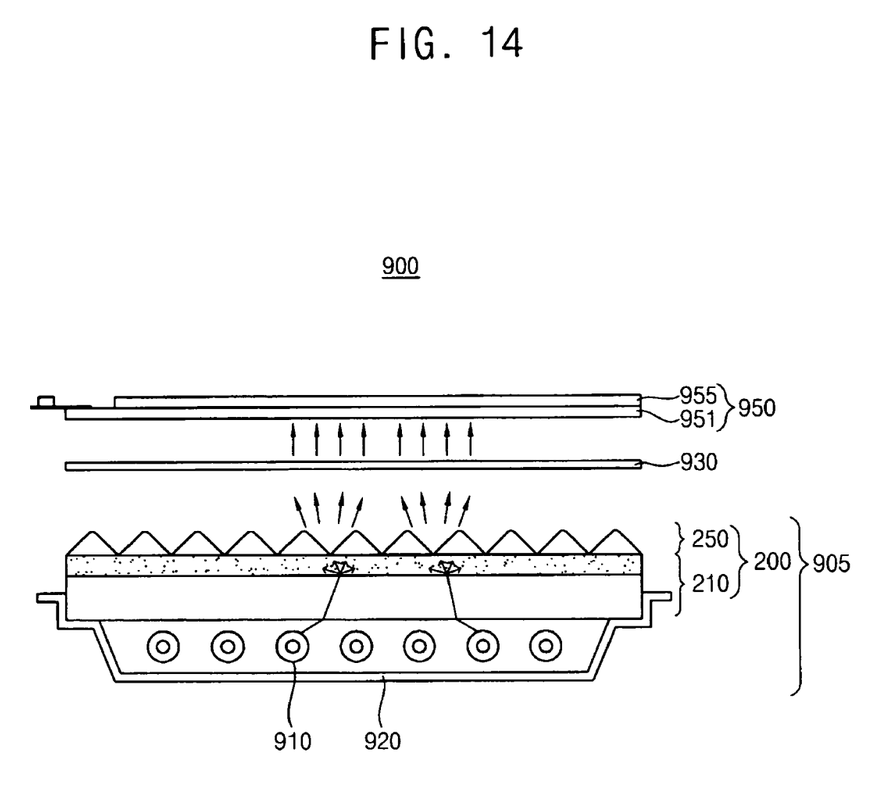
FIG. 14 is a cross-sectional view showing a display device in accordance with another exemplary embodiment of the present invention.

FIG. 14 is a cross-sectional view showing a display device 900 in accordance with another embodiment of the present invention.

A backlight assembly of FIG. 14 is the same as that shown in FIG. 12.

Referring to FIG. 14, the display device 900 includes a backlight assembly 905 and a display panel 950. The display panel 950 displays an image using light generated from the backlight assembly 905. The display panel 950 includes a first substrate 951, a second substrate 955 and a liquid crystal layer (not shown).

The first substrate 951 includes a lower substrate and a pixel electrode. The pixel electrode is on the lower substrate, and includes a transparent conductive material. Alternatively, a plurality of pixel electrodes may be arranged on the lower substrate in a matrix. The first substrate 951 may further include a switching element that receives a pixel voltage.

The second substrate 955 corresponds to the first substrate 951. The second substrate 955 includes an upper substrate and a color filter. The color filter corresponds to the pixel electrode. The color filter may include a red color filter portion, a green color filter portion and a blue color filter portion. The color filter transmits a portion of the light having a predetermined wavelength to display a color image. The second substrate 955 may further include a common electrode. The common electrode is located substantially on an entire surface of the second substrate 955. The common electrode includes a transparent conductive material, and corresponds to the pixel electrode.

Liquid crystals of the liquid crystal layer (not shown) vary their arrangement in response to an electric field applied between the pixel electrode and the common electrode, and thus a light transmittance of the liquid crystal layer (not shown) is changed, thereby displaying the image.

According to an embodiment of the present invention, the optical unit includes the diffusion part having the gas bubbles and the luminance increasing part having the embossing patterns. A difference between the refractive index of the gas bubbles and the refractive index of the body of the optical unit is greater than a difference between the refractive index of the beads and the refractive index of the body. When the size of the gas bubbles is decreased, the gas bubbles are adjacent to the surface of the body. Therefore, the amount of light diffused by the backlight assembly having the optical unit is increased, even when the backlight assembly does not include the diffusion plate and the diffusion sheet.

In addition, the luminance increasing part increases the surface area of the diffusion part, and decreases the incident angle of the light that is incident into the luminance increasing part. Therefore, the luminance increasing part increases the amount of the light exiting from the surface of the optical unit to increase the luminance of the backlight assembly when viewed on the plane.

Further, each of the embossing patterns may have the pyramid shape having the rounded apex to increase the luminance of the backlight when viewed on the plane. Therefore, the luminance of the backlight assembly having the optical unit when viewed on the plane is increased, even when the backlight assembly does not include a plurality of brightness enhancement sheets and a dual brightness enhancement sheet.

Therefore, not only are the optical characteristics of the backlight assembly improved by the optical unit, but the number of optical sheets used by the backlight assembly can be decreased. In addition, a thickness of the backlight assembly and thus a size of the display device can be decreased, thereby reducing a manufacturing cost of the backlight assembly and the display device.

While the present invention has been particularly illustrated and described with reference to embodiments thereof, it will be understood by those of ordinary skill in the art that various changes in form and details may be made therein without departing from the spirit and scope of the present invention as defined by the following claims.

What is claimed is:

1. An optical unit comprising:
   a transparent body;
   a diffusion part formed on the body to diffuse light; and
   a luminance increasing part including an embossing pattern formed on the diffusion part to increase a luminance of the diffused light when viewed on a plane, wherein a first side of the diffusion part is in continuous contact with a surface of the body and a second side of the diffusion part is in continuous contact with a surface of the luminance increasing part,
   wherein a side of the embossing pattern makes contact with the diffusion part.

2. The optical unit of claim 1, wherein the diffusion part comprises a plurality of diffusion elements.

3. The optical unit of claim 2, wherein the diffusion elements comprise gas bubbles.

4. The optical unit of claim 3, wherein each of the diffusion elements is about 1 μm to about 100 μm.

5. The optical unit of claim 2, wherein the diffusion elements comprise beads.

6. The optical unit of claim 1, wherein the luminance increasing part comprises an embossing part including a substantially polygonal pyramid shape having a rounded apex.

7. The optical unit of claim 1, wherein the luminance increasing part comprises an embossing part including a substantially polygonal pyramid shape and a substantially conical shape without a rounded apex.

8. The optical unit of claim 1, wherein the luminance increasing part comprises an embossing part that is protruded from the body, and the embossing part comprises a plurality of gas bubbles.

9. The optical unit of claim 1, wherein the luminance increasing part comprises an ultraviolet light curable resin.

10. The optical unit of claim 1, further comprising an ultraviolet light blocking layer formed on the body to prevent a coloration of the body, wherein the ultraviolet light blocking layer is not adjacent to the diffusion part.

11. A method of manufacturing an optical unit comprising:
    forming a diffusion part on a transparent plate including a polymer resin; and
    forming a luminance increasing part including an embossing pattern on the diffusion part, wherein a first side of the diffusion part is in continuous contact with a surface of the transparent plate and a second side of the diffusion part is in continuous contact with a surface of the luminance increasing part,
    wherein a side of the embossing pattern makes contact with the diffusion part.

12. The method of claim 11, wherein the diffusion part is formed by:
    supplying the transparent plate with gas at a pressure higher than an atmospheric pressure so that the gas is absorbed in the transparent plate; and
    expanding the absorbed gas to form the gas bubbles in the transparent plate.

13. The method of claim 12, wherein the gas is absorbed in the transparent plate by ejecting the gas at the pressure higher than the atmospheric pressure so that the gas is injected into spaces formed by chains of high polymer molecules of the transparent plate.

14. The method of claim 12, wherein the gas bubbles are formed by:
    heating the transparent plate having the absorbed gas to expand the absorbed gas; and
    discharging the expanded gas from the transparent plate.

15. The method of claim 12, wherein the gas comprises at least one selected from the group consisting of air, carbon dioxide, nitrogen and oxygen.

16. The method of claim 12, wherein the diffusion part is formed by:
    arranging diffusion beads in the transparent plate or on the surface of the transparent plate.

17. The method of claim 11, wherein the luminance increasing part is formed by:
    coating an ultraviolet light curable resin layer on the transparent plate having the diffusion part;
    pressing the ultraviolet light curable resin layer using a cast having a pattern corresponding to the embossing pattern to form the embossing pattern on the ultraviolet light curable resin layer; and
    irradiating an ultraviolet light onto the ultraviolet light curable resin layer having the embossing pattern to solidify the ultraviolet light curable resin layer having the embossing pattern.

18. The method of claim 17, wherein the ultraviolet light curable resin comprises at least one selected from the group consisting of an acryl based resin, an acetophenone based resin, a benzophenone based resin and a thioxanthone based resin.

19. The method of claim 17, further comprising forming a plurality of gas bubbles in the ultraviolet light curable resin layer having the embossing pattern.

20. The method of claim 11, further comprising forming an ultraviolet light blocking layer on the transparent plate corresponding to the luminance increasing part.

21. A backlight assembly comprising:
a light source; and
an optical unit including:
a transparent body;
a diffusion part formed on the body to diffuse light generated from the light source; and
a luminance increasing part including an embossing pattern formed on the diffusion part to increase a luminance of the diffused light when viewed on a plane, wherein a first side of the diffusion part is in continuous contact with a top surface of the body and a second side of the diffusion part is in continuous contact with a surface of the luminance increasing part,
wherein a side of the embossing pattern makes contact with the diffusion part.

22. The backlight assembly of claim 21, wherein the luminance increasing part guides the diffused light toward a front of the optical unit.

23. The backlight assembly of claim 21, wherein the light source is arranged on a bottom surface of the body opposite the luminance increasing part, and the backlight assembly further comprises a diffusion sheet formed on the luminance increasing part to diffuse the light.

24. The backlight assembly of claim 21, further comprising:
a light guiding unit including:
a light incident portion through which the light generated from the light source is incident; and
a light exiting portion facing a bottom surface of the optical unit.

25. A display device comprising:
a display panel that displays an image based on uniform light; and
a backlight assembly supplying the display panel with the uniform light, the backlight assembly including:
a light source; and
an optical unit including a transparent body, a diffusion part formed on the body, the diffusion part having a porous medium to diffuse light generated from the light source, and a luminance increasing part including an embossing pattern formed on the diffusion part to increase a luminance of the diffused light when viewed on a plane to generate the uniform light, wherein a first side of the diffusion part is in continuous contact with a surface of the body and a second side of the diffusion part is in continuous contact with a surface of the luminance increasing part,
wherein a side of the embossing pattern makes contact with the diffusion part.

* * * * *